Jan. 10, 1961  W. S. TAYLOR  2,967,429
MEASURING APPARATUS
Filed Jan. 29, 1960
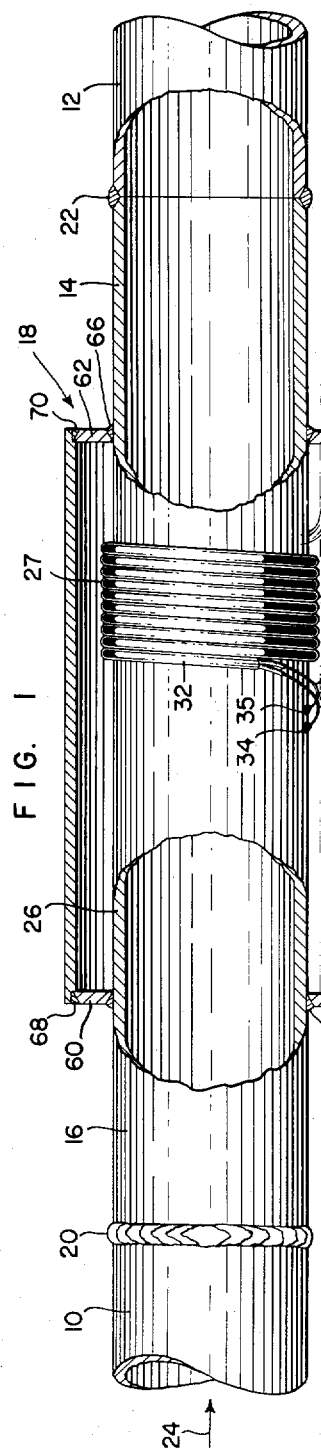
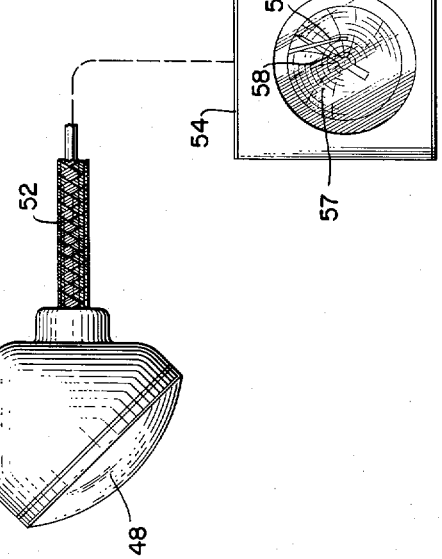
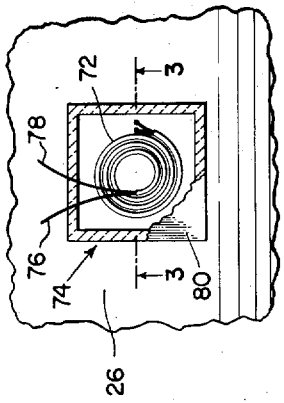
INVENTOR.
WILLIAM S. TAYLOR
BY *Arthur H. Swanson*
ATTORNEY.

United States Patent Office 2,967,429
Patented Jan. 10, 1961

2,967,429
MEASURING APPARATUS
William S. Taylor, Drexel Hill, Pa., assignor to Minneapolis-Honeywell Regulator Company, Minneapolis, Minn., a corporation of Delaware
Filed Jan. 29, 1960, Ser. No. 5,431
12 Claims. (Cl. 73—359)

The object of the present invention is to provide an apparatus which will more accurately measure the temperature of a fluid mass within a flow container than has heretofore been disclosed in the prior temperature measuring art.

More specifically it is advantageous to employ this temperature measuring apparatus to accurately measure the temperature of a fluid such as milk that is passing through a flow conduit. Such fluids must be required by public health laws and trade associations, for example the International Association of Milk and Food Sanitarians, Inc. to pass rigid accurate temperature test measurements as they are passed through such a flow line during the time they are undergoing pasteurization or other treatment in a milk processing plant.

Prior temperature measuring devices which have employed a thermally sensitive liquid, thermistor or a thermocouple within a metal probe to sense the temperature of fluids of the aforementioned type have not been satisfactory because of the following reasons: First, because of the deleterious effect that heat dispelled by the fluid at positions external to the point where a temperature measurement is being taken has on the temperature being sensed by the temperature sensing element and second because heat due to changes in ambient temperature is adversely transmitted through the conduit wall and metal probe to this temperature sensing element, prevents the true temperature of the liquid at a desired point in the flow line from being measured. It can thus be seen for the aforementioned reasons that sensing elements which employ these protecting tubes cannot sense a true temperature reading of the temperature of a flowing fluid at a specific spot in a process flow tube.

It is therefore another object of the present invention to provide a temperature measuring apparatus that eliminates the cause of the aforementioned inaccurate temperature sensing noted supra by providing an insertible thin wall flow tube section having a thermocouple in contact therewith as a portion of a flow line and which section has an elongated dead air or vacuum retaining jacket completely surrounding its external wall.

It is still another object of the present invention to provide this improved measuring apparatus with a hot thermocouple junction that is retained in a fixed position on the outside diameter of the thin walled flow tube which junction is located at a central position between the end walls of the jacket and which arrangement prevents ambient temperature and heat flow by convection from occurring between other external parts of the flow conduit to this hot junction.

It is still another object of the present invention to provide a flow tube section having an elongated jacket of the aforementioned type which jacket provides a sufficiently large area into which heat that is expelled from the aforementioned hot junction may readily be conducted away from such a junction so that the true temperature of the milk and/or other liquid being sensed by the thermocouple will not be adversely affected by the undesired heat flow being expelled by the hot junction into the space enclosed by the jacket.

It is another important object of the present invention to provide a thin wall flow tube section of the aforementioned type having an improved temperature sensing apparatus therein which can be installed in any part of a process flow line to make an instantaneous measurement of the temperature of the fluid at that particular point in the process.

It is still another object of the present invention to provide a thermocouple lead wire arrangement in which the lead wire is wrapped substantially ten times about the outer wall of the flow tube section in order to prevent changes in ambient temperature occurring in the lead wires at the points where these wires protrude through the flow tube jacket from affecting the temperature of the hot junction and hence the true E.M.F. and current flow generated in the thermocouple lead wires and its associated potentiometric measuring circuit.

It is also another object of the present invention to provide a temperature sensing element which is extremely sanitary because no portion of this temperature sensing element is required to come into direct contact with the flowing process fluid whose temperature it is measuring and hence does not have to be steam cleaned after use to remove any bacteria that may have adhered thereto or which has grown thereon as is required when prior art probe type temperature sensing elements are used.

From the aforementioned remarks it is evident that it is one of the principal objects of the present invention to provide a temperature measuring apparatus that will enable a section of a flow line to be isolated in order to make a continuous true measurement of the temperature of the fluid passing therethrough at a particular spot in the flow tube section.

In the drawing:

Figure 1 discloses how a flow tube section having an in-wall sanitary thermocouple of the aforementioned described type can be inserted in a flow line to measure the temperature of a fluid flowing therethrough;

Figure 2 shows schematically how a resistance thermometer coil can be used in lieu of the thermocouple hot junction shown in Figure 1 to sense the temperature of a fluid flowing through a flow line; and Figure 3 shows a section elevation view of Figure 2 taken along the lines 3—3 of Figure 2.

Referring now to the drawing in detail it can be seen that there is shown two open ended portions 10, 12 of a flow tube against the end portions of which the ends 14, 16 of a substantially thin flow tube section, generally designated by the reference numeral 18, abut. Suitable braising or other welding material 20, 22 are shown joining the respective abuting ends 12, 14 and 10, 16 together.

The flow of a fluid which may be either in a gaseous or liquid state, is transmitted through tube 10, flow tube section 18 and thence through tube 12 in a direction as indicated e.g. by the arrow 24.

Tightly coiled about the outer wall of a tubular portion 26 that extends between the flow tube ends 14 and 16 there is shown ten turns of insulated thermocouple wire 27 comprised of two dissimilar thermocouple leads 28, 30 which are covered by a suitable insulating material such as Teflon 32.

The bare left end of each of these thermocouple leads 28, 30 is respectively shown braised or silver soldered at 34 and 35 to the outer surface of the tubular portion 26 to form a hot junction at this end of the thermocouple leads.

The other end portion of these thermocouple leads, identified by the reference number 36, is shown passing through a passageway 38 formed in the wall portion of jacket 40 which surrounds and is spaced from the tubular portion 26. A partially sealed-off embossed sleeve portion 42 inserted in this passageway 38 is shown welded to the exterior of the wall of the jacket 40 at 44. The material 46 shown sealing off the space between the embossed sleeve 42 forming the passageway and the thermocouple lead portion 36 may be any suitable temperature resistant sealing material such as a suitable epoxy resin.

A commercially available casing forming a thermocouple head 48 is shown connected by suitable threads at 50 to the outer wall of the embossed sleeve portion 42. The thermocouple lead portion 36 is protected by the steel conduit 52 and is shown connected in a conventional fashion with the outlet of this thermocouple head 48 at one end and at its other end with an indicating potentiometer 54 and a cold junction of a remaining portion of this measuring circuit contained therein, but which is not shown in the drawing.

This potentiometer may be of the type such as that which is disclosed in the Wills Patent 2,423,540, issued July 8, 1947. This indicating potentiometer is provided with a pen 56 which moves across a chart 57 in one direction or another depending on whether the temperature being sensed at the hot thermocouple junction 34, 35 by leads 28, 30 in contact with the thin wall tube 26 is being increased or decreased. This indicating potentiometer is also provided with a rotatable pointer 58 to indicate whether the aforementioned temperature sensed by the thermocouple at its hot junction is increasing or decreasing.

The wall 40 which forms a portion of the jacket about the tubular section 26 is shown having circular end wall portions 60, 62 which circumvent the tubular portion 26. The inner surface of each circular wall portion 60, 62 is welded by suitable welding material along each of their entire respective inner diametral surfaces to the thin wall tube 26 as is indicated at 64, 66.

The outer peripheral surface of these end wall portions 60, 62 are also welded by suitable welding material along each of their entire diametral surfaces to their associated ends of the jacket part 40 as is indicated at 68, 70.

It should be understood that it is preferred that the flow tube section 14, 16, 26 be made of any good heat conducting material such as copper, aluminum, or an alloy of either. It should be further understood, however, that other slightly less heat conductive materials such as stainless steel per se or stainless steel with either a copper or aluminum coating or copper strips bonded to its exterior surface in the area, in which the hot thermocouple junction temperature measurement is to be sensed may also be satisfactorily used for this thin wall flow tube section 14, 16, 26.

By placing jacket 40, 60, 62 about a portion of such a heat conductive flow tube portion 26 the hot junction formed between the left ends of the thermocouple leads 28, 30 fixedly attached at 34 and 35 to this flow tube portion 26 is thus isolated from any undesired deleterious effects that changes in ambient temperature would otherwise have on the true temperature of fluid being sensed at this hot thermocouple junction. The space formed by the jacket 40, 60, 62 about the flow tube portion 26 which may be either a dead air space or an evacuated space also provides a sufficiently large area into which the heat expelled by the hot junction of the thermocouple can readily flow. This large jacketed air space arrangement prevents any heat from building up around the thermocouple which would otherwise cause it to sense an erroneous temperature of the fluid passing through the tube 26.

Another advantage of this arrangement is that such a dead air or vacuum space formed by the jacket 40, 60, 62 allows any heat which is flowing through the tube wall 16, 14 toward the hot thermocouple junction 34 from portions of the tube which are located to the left and right of the point where the hot junction is making a temperature reading to be dissipated into this space before it reaches the hot junction. In this capacity the dead air space or vacuum again advantageously serves as a means of assuring that only the true temperature of the fluid within the flow tube will be sensed by the hot junction of the thermocouple.

Experimentation has shown that ten tightly wrapped coils of thermocouple wire 27, as shown in the drawing are a suitable number to prevent any stray heat changes which may be picked up by the thermocouple wire portion 26 from effecting the E.M.F. or current flow in this thermocouple wire that is caused by the temperature sensed at the hot junction 34.

Figures 2 and 3 show schematically how a resistant coil element 72 of a resistance thermometer 74 which is comprised of a fine wire, such as platinum, can be fixedly connected to the outer surface of the tubular section 26.

Figures 2 and 3 also show leads 76, 78 of this resistance thermometer 74 protruding from the coiled sensing element 72 which may in turn be connected to any commercially available resistance thermometer bridge circuit, not shown, that is located outside the tubular section 26 to enable the temperature of the fluid flowing through this tubular section 26 to be measured. Suitable insulation such as commercially available Fiberglas insulation 80 is shown completely surrounding the coil element 72 and fixedly connected at its entire outer contacting area by means of a suitable heat resistance cement material at 80 to the tubular section 26.

It can also be seen that a single sanitary flow tube section having a temperature sensing element therein has been disclosed that can be readily installed as any part of a process flow line without interfering with the flow of fluid passing therethrough or requiring the temperature sensing element which is measuring the temperature of the fluid in this flow line to be cleaned off by steam after use in order to rid it of any bacteria or other foreign matter that was present in this fluid.

From the aforementioned remarks it can be seen that a sanitary thermocouple of the aforementioned type has been devised for the food, dairy and other industrial flow line applications to rapidly, accurately and continuously measure the temperature of a fluid as it passes by a selected point in a flow tube.

What is claimed is:

1. An apparatus to accurately measure the temperature of a fluid flowing through a flow tube, comprising a thin walled tubular section adapted to be inserted as a part of said flow tube, a jacket connected to said section and forming an air tight dead air space entirely about a periphery of the outer wall of said tubular section, insulated thermocouple wire forming a portion of a temperature measuring circuit positioned within said jacket and coiled about said outer wall of said tubular section, said wire having a hot junction at one end of said coil and being fixedly positioned on the outer wall of said tubular section at a position midway between the ends of said section, said jacket being provided with a partially sealed off passageway to accommodate the passage of the other end of said coil therethrough and said other end of said wire coil being connected to a temperature indicating means which forms a remaining portion of said thermocouple measuring circuit.

2. An apparatus to accurately measure the temperature of a fluid flowing through a flow tube, comprising a thin walled tubular section adapted to be inserted as a part of said flow tube, a jacket connected to said section and forming an evacuated space entirely about a periphery of the outer wall of said tubular section, insulated thermocouple wire forming a portion of a temperature measuring circuit positioned within said jacket and coiled about said outer wall of said tubular section, said wire having a hot junction at one end of said coil and being fixedly positioned on the outer wall of said tubular section at a position midway between the ends of said section, said jacket being provided with a partially sealed off passageway to accommodate the passage of the other end of said coil therethrough and said other end of said coil being connected to a temperature indicating means which forms a remaining portion of said thermocouple measuring circuit.

3. A temperature-sensitive apparatus for use with a potentiometric measuring circuit to accurately measure the temperature of fluid within a flow tube, comprising an elongated jacket connected to and forming a dead air space about an external circumferential wall portion of said tube, two dissimilar thermocouple leads of said potentiometric measuring circuit having one of each of their end portions fixedly connected to said wall portion at a position that is substantially midway between the ends of said elongated jacket and having their remaining end portions passing through a partially sealed-off passageway in said jacket and connected to a remaining portion of said circuit to continuously measure changes occurring in the temperature of said fluid within said flow tube.

4. A temperature-sensitive apparatus for use with a potentiometric measuring circuit to accurately measure the temperature of fluid passing through a flow tube, comprising an elongated jacket connected to and forming a dead air space about an external circumferential wall portion of said tube, two dissimilar thermocouple leads of said potentiometric measuring circuit having one of each of their end portions fixedly connected to said wall portion and in spaced apart relationship at a position that is midway between the ends of said elongated jacket and having their remaining end portions passing through a partially sealed-off passageway in said jacket and connected to a remaining portion of said circuit to continuously measure changes occurring in the temperature of said fluid passing through said flow tube.

5. An apparatus to continuously measure the temperature of a fluid passing through a section of a flow tube, comprising a jacket circumferentially spaced about a portion of said tube to form a dead air space about said section, a pair of thermocouple leads having a portion coiled tightly about said section and an end portion of each lead being connected to the section of said tube by means of an electrically conducted solder material at a position that is centrally located between the ends of said section to form a hot junction therewith and a remaining end portion of said leads extending through a partially sealed-off passageway in the wall of said jacket and connected at its other end to an indicating potentiometer to indicate when temperature changes occur in said hot junction.

6. An apparatus to continuously measure the temperature of a fluid passing through a section of a flow tube, comprising a jacket circumferentially spaced about a portion of said tube to form a dead air space about said section, a pair of thermocouple leads having a portion coiled substantially ten times about said section and an end portion of each lead being connected to said tube by means of an electrically conducted soldered material at a position that is centrally located between the ends of said section to form a hot junction therewith and a remaining end portion of said lead extending through a partially sealed-off passageway in the wall of said jacket and connected at its other end to an indicating potentiometer to indicate when temperature changes occur in said hot junction.

7. A temperature sensitive apparatus for use with a potentiometric measuring circuit to measure the temperature of heated fluid milk within a flow tube used in a milk pasteurizing process, comprising a thermocouple forming a portion of said circuit having a hot junction adapted to be fixedly connected to an outer peripheral portion of said flow tube, an elongated jacket connected to a portion of said tube to form a dead air space area thereon and having end portions that are equally spaced from said hot junction, and said dead air space area being of a dimension to isolate said hot junction from undesired extraneous heat flows and to permit heat expelled by said hot junction to flow readily into and through said dead space.

8. The apparatus as defined in claim 7 wherein said thermocouple of said potentiometric measuring circuit is further provided with thermocouple wire that is wrapped substantially ten times about said flow tube.

9. The apparatus as defined in claim 7 wherein said thermocouple of said potentiometric measuring circuit is further provided with thermocouple wire that is wrapped substantially ten times about said flow tube and wherein said jacket is provided with a partially sealed-off passageway through which a remaining portion of said wire passes to enable the other ends of said wire to be connected to a temperature indicating means which forms a portion of said potentiometric measuring circuit.

10. A temperature sensitive apparatus for use with a potentiometric measuring circuit to measure the temperature of a heated fluid within a flow tube, comprising a thermocouple forming a portion of said circuit and having its hot junction adapted to be fixedly connected to an outer peripheral portion of said flow tube, an elongated jacket connected to a portion of said tube to form a dead air space area thereon and having end portions that are equally spaced from said hot junction, said dead air space area being of a dimension to isolate said hot junction from undesired extraneous heat flows and to permit heat expelled by said hot junction to flow readily into and through said dead space.

11. A temperature sensitive apparatus for measuring the temperature of a fluid as it passes through a flow tube and against a selected thin wall segment of said tube, comprising a temperature-sensitive element adapted to be fixedly connected to said outer diametral surface of said thin wall segment of said flow tube, an elongated jacket connected to spaced apart portions of said tube by means of end portions that are each spaced at substantially the same distance from said temperature-sensitive element and a dead air space area being formed by said jacket and outer diameter of said tube which is of a dimension to isolate said temperature-sensitive element from undesired deleterious heat flows caused by changes in ambient temperature and to enable said sensitive element to sense only the true temperature of said fluid passing through said thin wall segment of said tube.

12. Apparatus for use in measuring the temperature of a fluid flowing through a flow conduit, comprising the combination of a flow tube having a thermally conductive wall adapted to be inserted as part of said flow conduit, a pair of terminals, an electrical temperature sensitive element having a temperature responsive portion in close thermal contact with an outer peripheral portion of the wall of said flow tube and having electrical connections to said pair of terminals, and an elongated jacket connected to a portion of said tube to form a dead air space area around said tube and having end portions that are substantially equally spaced from the temperature responsive portion of said temperature sensitive element, said dead air space being effective substantially to isolate said temperature responsive portion of said temperature sensitive element from undesired extraneous heat flows.

References Cited in the file of this patent

UNITED STATES PATENTS

| | | |
|---|---|---|
| 2,025,617 | Schramm | Dec. 24, 1935 |
| 2,048,680 | Bird | July 28, 1936 |
| 2,699,059 | Whitehouse | Jan. 11, 1955 |
| 2,752,411 | Walter | June 26, 1956 |
| 2,804,773 | Domingo | Sept. 3, 1957 |

FOREIGN PATENTS

| | | |
|---|---|---|
| 739,694 | Great Britain | Nov. 2, 1955 |

OTHER REFERENCES

Pease Journal of Scientific Instruments, December 1955, pp. 73–341.